Sept. 23, 1924.
J. VALENTA
DOUGH FORMING MACHINE
Filed Oct. 3, 1922    2 Sheets-Sheet 1
1,509,455
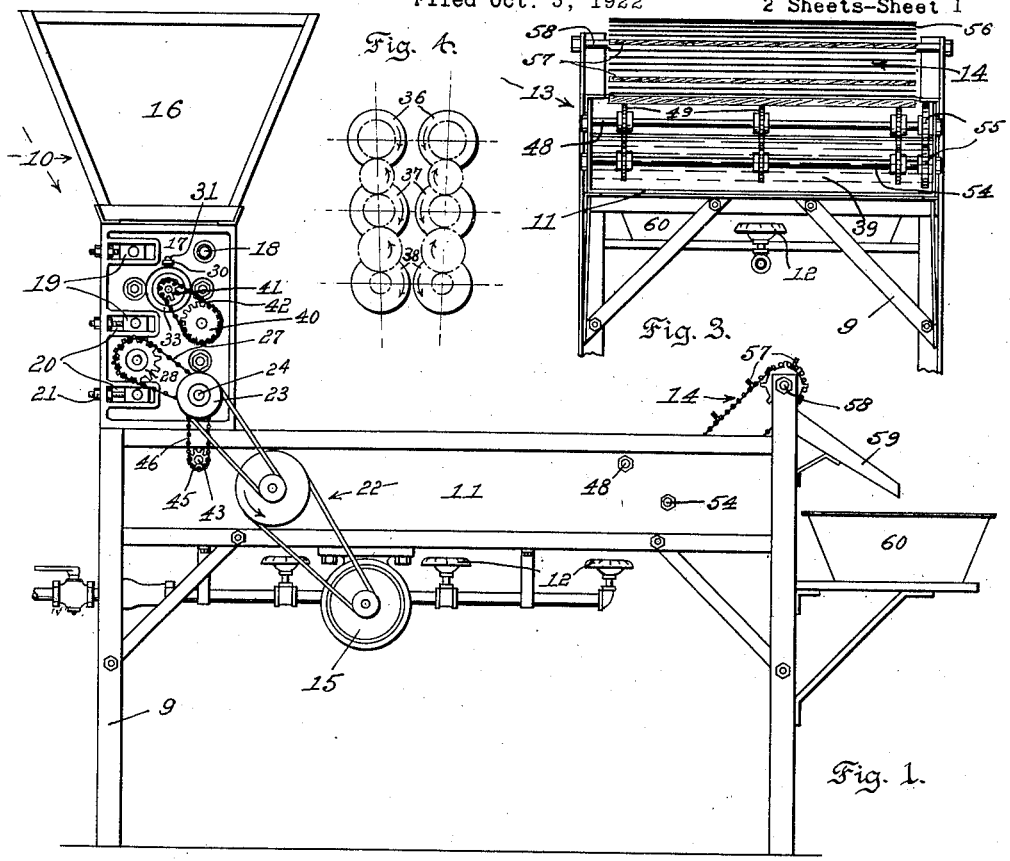
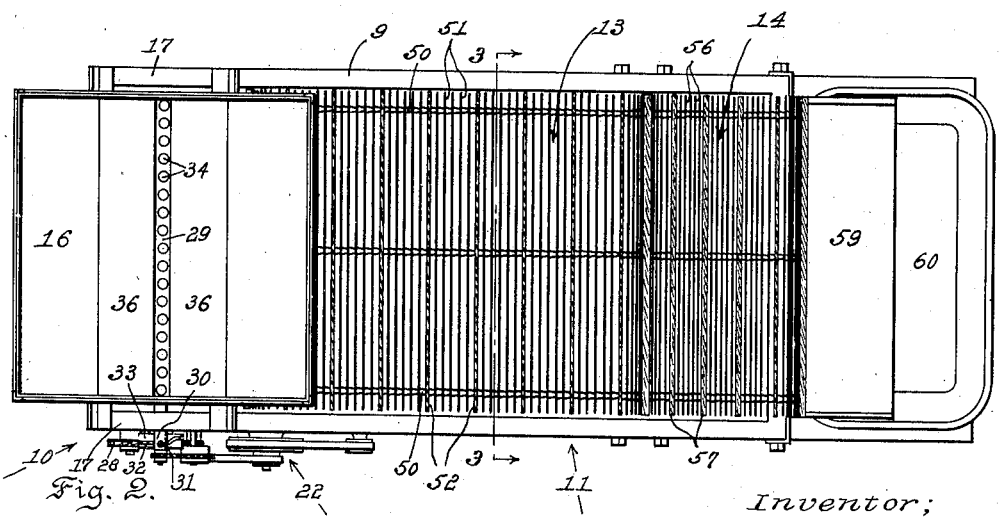
Inventor;
Joseph Valenta,
per A. K. Martell
Attorney.

Sept. 23, 1924.
J. VALENTA
1,509,455
DOUGH FORMING MACHINE
Filed Oct. 3, 1922     2 Sheets-Sheet 2
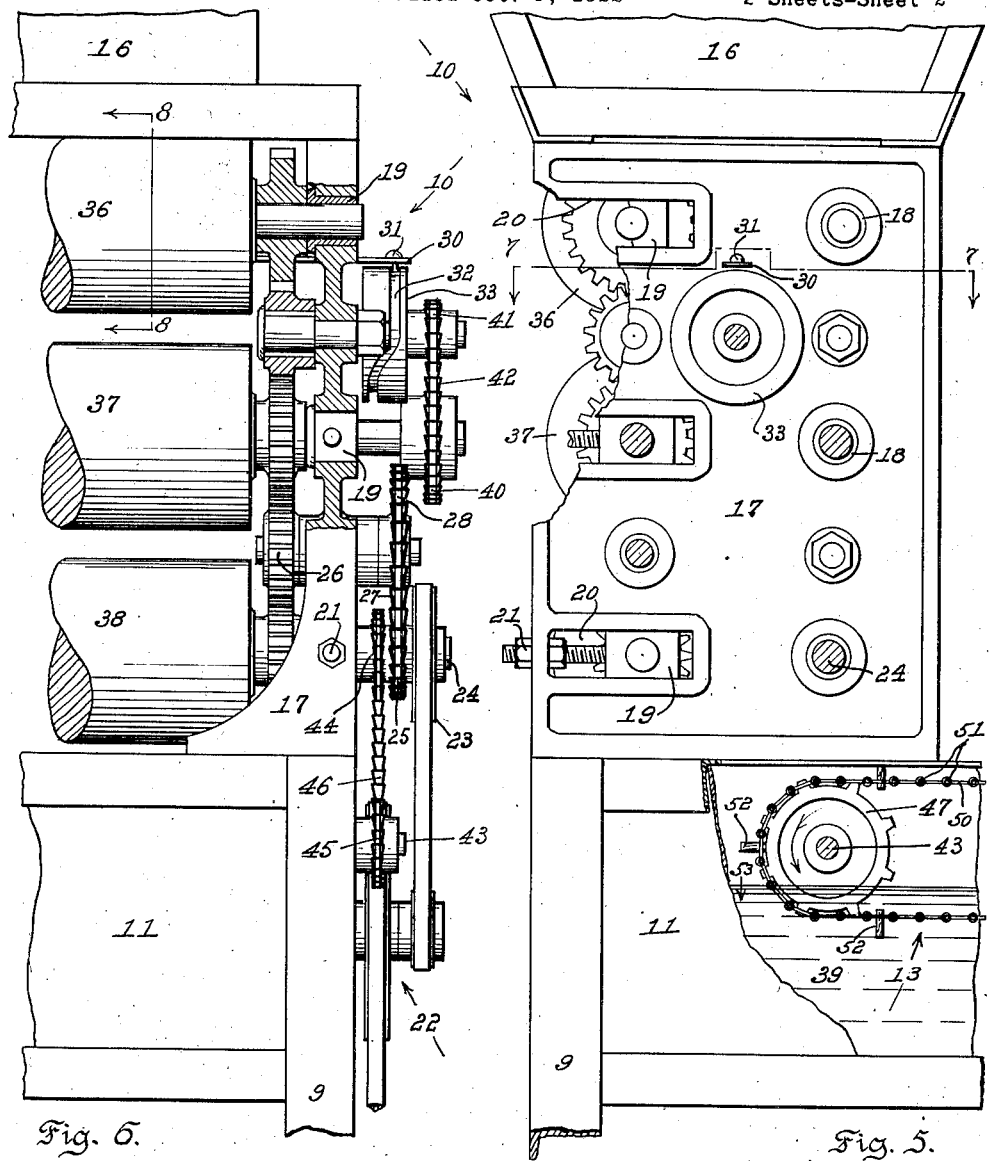
Fig. 6.
Fig. 5.
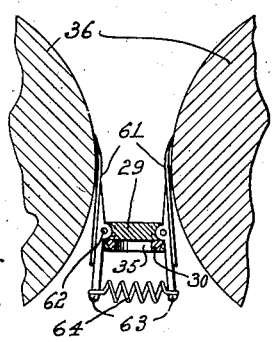
Fig. 8.
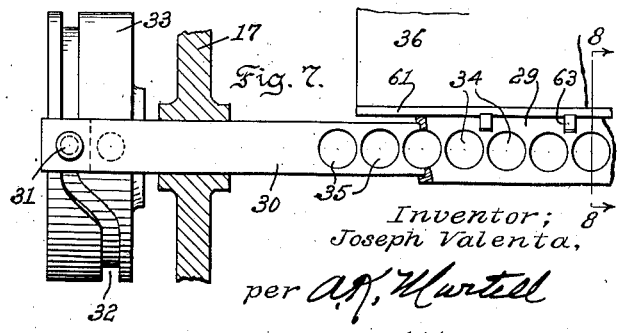
Fig. 7.
Inventor;
Joseph Valenta,
per A. J. Martell
Attorney.

Patented Sept. 23, 1924.

1,509,455

UNITED STATES PATENT OFFICE.

JOSEPH VALENTA, OF TAFT, CALIFORNIA.

DOUGH-FORMING MACHINE.

Application filed October 3, 1922. Serial No. 592,091.

*To all whom it may concern:*

Be it known that I, JOSEPH VALENTA, a citizen of the United States, residing at Taft, in the county of Kern and State of California, have invented new and useful Improvements in Dough-Forming Machines, of which the following is a specification.

My invention relates to dough forming machines; and the objects of my invention are, first, to provide a machine of this class in which the kneaded dough is rolled, cut, and made of uniform size and shape prior to frying; second, to furnish means for independent adjustment of the principal functions of the machine to secure satisfactory cooperation of the parts involved; and, third, to achieve the foregoing results in a device that is relatively inexpensive to construct and operate.

Other objects and advantages will appear hereinafter and while I show herewith and will describe a preferred form of construction, I desire to be understood that I do not limit myself to such preferred form, but that various changes and adaptations may be made therein without departing from the spirit of my invention as hereinafter claimed:

I attain my objects by the mechanism illustrated in the accompanying drawings, in which:

Figure 1 is a side elevation, and Figure 2 is a plan view of the complete machine. Figure 3 is a fragmentary sectional elevation taken on the line 3—3 of Fig. 2, and looking in the direction of the arrows.

Figure 4 is a diagram only, and is for the purpose of showing the relative spacing and positioning of the rolls, and of the gear trains driving them.

Figure 5 is an enlarged fragmentary side elevation of the left hand portion of the machine in which the dough is handled prior to frying, with certain parts broken away, and the gear mechanism removed; and Figure 6 is the corresponding end elevation of this same portion, but with the driving mechanism shown in place.

Figure 7 is a further enlarged fragmentary detail plan section taken on the line 7—7 of Fig. 5; and Figure 8 is a fragmentary cross sectional detail in elevation, and taken on the line 8—8 of Fig. 6 and 7.

Similar numerals refer to similar parts throughout the several views.

My invention comprises the structural frame 9 supporting the dough handling mechanism, indicated by arrow 10; the elongated rectangular frying vat 11; the heating means, as the gas burners 12; the fry timing mechanism, indicated by arrow 13; the discharging mechanism, as per arrow 14; and the driving means as the motor 15.

The dough when properly mixed and kneaded is deposited in the bottomless elevated hopper 16. Directly beneath this are two sets of three rolls each. These roll sets are parallel in plan, but in elevation they converge slightly from top to bottom, as seen in the diagram of Fig. 4. The rolls are supported in bearings carried by a pair of end frames 17; the rear, or right hand, set of rolls having fixed bearings as 18, and the front, or left hand, set having slidable bearings 19. The latter are seated within slots 20 in the end frames, and are capable of lateral adjustment by means of the studs and nuts 21.

The rolls are individually driven by spur gears keyed to their journal shafts, the gears of each set of rolls being in train through intermediate idle gears, and thus constrained to revolve in the same direction. On the other hand the two sets of rolls obviously must revolve in opposite directions. Opposed rolls revolve at the same speed but the angular velocity of the intermediate pair of rolls is greater than the top pair, and the velocity of the bottom pair is greater than that of the intermediate pair. This is all accomplished by the gearing ratios and the reasons therefor will presently be explained.

In the form of the invention selected for illustrative purposes, the whole mechanism is actuated by motor 15 through a double reduction V belt transmission as per arrow 22, driving pulley 23, keyed to shaft 24, of the lower right hand roll, the direction of rotation being counter clockwise. A sprocket 25 on this same shaft drives intermediate gear 26 by means of chain 27 and sprocket 28. The two sets of rolls are thus driven in opposite directions, the forward, or left hand set, in a clockwise direction; and the rear, or right hand set, in a counter clockwise direction.

Between the upper pair of rolls, and slightly below their axes, is a fixed multiperforate die bar 29, supported by the end frames 17. Beneath this die bar, and in contact with it, is the multiperforate cutoff bar 30, which is slidable longitudinally through the end frames 17. In the drawings I have shown the cut-off bar lontitudinally dove-tailed into the die bar, as indicated most clearly in Fig. 8.

The outer end of the cut-off bar carries a transverse pin 31 for actuating it. This pin is adapted to engage the peripheral slot 32 of the cylindrical cam wheel 33, and by this means the cut-off bar is periodically given a rapid longitudinal displacement equivalent to the distance between the centers of holes 34 in the die bar.

These displacements of the cut-off bar are reciprocal, and at each rest position the holes 35 in the latter register with the holes 34 in the die bar.

In operation the upper rolls 36 receive the dough from the hopper above and force it downward through the registering perforations in the die bar and cut-off bar. The periodical reciprocations of the latter cuts the exuded dough into cylindrical chunks of substantially equal length, and these drop down between the two intermediate rolls 37 which are set somewhat closer together, and revolve at slightly higher speed than the pair above then. The pass through the intermediate rolls flattens and elongates the dough chunks into an elliptical form, and they then drop down between the lower rolls 38. The pass through the lower rolls, which are set closer together and revolve at a higher speed than the intermediate rolls, further flattens and elongates the dough chunks, and after leaving the rolls they drop into the hot fat 39 of the frying vat 11.

It should be explained before passing to the next step in the process, that cam 33 may be driven in any convenient manner as by the sprockets 40 and 41 and chain 42. This drive, however, should be positive. It should also be noted that, by means of the studs 21 and slidable bearings 19, the gaps between the respective pairs of rolls may be so adjusted that at each pass the dough is flattened and elongated to just the proper degree, and not sufficiently to allow piling up or accummulation of the dough chunks between passes.

Passing now to the fry timing apparatus 13, it will be noted that shaft 43 is driven from shaft 24 by means of sprockets 44 and 45 and chain 46 located on the outside of the frying vat. On the inside of the vat this shaft carries a set of three fixed sprockets 47. At the other end of the vat is a revolvable shaft 48 upon which are mounted three idling sprockets 49. These three opposed pairs of sprockets respectively carry the chains 50, and the latter carry the transverse round rods 51 and spaced flight bars 52, the whole constituting an inverted flight conveyor revolving counter clockwise.

The flattened dough slabs drop into the fat at 53, and, as the paddle action of the flight bars creates a current therein, are drawn under the conveyor and forced to slowly travel the length of the vat below the surface of the fat. The speed of the conveyor may be regulated by motor resistance so that the dough is properly fried, and ready to be elevated from the fat, when it arrives at the right hand end of the conveyor.

The elevating or discharging mechanism 14 is similar in construction to the fry timing conveyor. It comprises the revolvable submerged shaft 54, driven by the engaged spur gears 55 from shaft 48; and rods 56 and flight bars 57 arranged in a manner identical with the construction just described. Instead of being horizontal, however, this conveyor is inclined and it carries the fried slabs upon its upper surface. At its upper end it is carried by a set of sprockets on shaft 58 above the frying vat and mounted upon vertical extensions of the frame members at that end of the machine. The fried slabs are delivered to the elevator by means of the current in the fat already referred to, and are lifted out of the fat, elevated, and finally discharged into chute 59 and receiving pan 60.

A further feature of the invention remains to be described, namely, the means of sealing the space between the upper rolls and the die bar. Figs. 7 and 8 illustrate a preferred method of accomplishing this. A stripping plate 61 is plurally hinged at 62 to each side of the die bar by means of attached hinge levers 63. The latter have extensions depending below the bar and these are connected in pairs by tension springs 64. The stripping plates are thus held against the rolls, and dough is unable to pass die bar 29 except through the die holes.

The lower two pairs of rolls will not require stripping but with certain classes of dough may need periodical or continuous greasing. The latter may be accomplished by grease brushing, or by means of pumped grease supplied by a small pump driven from the described mechanism and taking its suction from the frying vat. Such a device would be obvious and I have not deemed it necessary to show it herein.

Having thus fully described my invention, I claim:

1. In a device of the character described, in combination, a bottomless hopper; plural pairs of opposed rolls in vertical arrangement below said hopper; an exuding plate between the upper of said pairs below the axial plane thereof; closure means comprising hinged stripping plates between said upper rolls and said exuder; and cut-off means below said exuder.

2. In a device of the character described, in combination, a bottomless hopper; plural pairs of opposed rolls in vertical arrangement below said hopper, said pairs having successively reduced spacing; an exuding plate between the upper of said pairs below the axial plane thereof; closure means comprising hinged stripping plates between said upper rolls and said exuder; and cut-off means below said exuder above the second of said pairs.

3. In a device of the character described, in combination, a bottomless hopper; plural pairs of opposed rolls in vertical arrangement below said hopper, said pairs having successively reduced spacing and being arranged for successively increasing angular velocities; an exuding plate between the upper of said pairs below the axial plane thereof; closure means comprising hinged stripping plates between said upper rolls and said exuder; and cut-off means below said exuder above the second of said pairs.

4. In a device of the character described, in combination, a bottomless hopper; plural pairs of opposed rolls in vertical arrangement below said hopper, said pairs having successively reduced spacing and being arranged for successively increasing angular velocities; means for laterally adjusting the position of one of each pair of rolls to vary the spacing therebetween; an exuding plate between the upper of said pairs below the axial plane thereof; closure means comprising hinged stripping plates between said upper rolls and said exuder; and cut-off means below said exuder above the second of said pairs.

JOSEPH VALENTA.